April 25, 1961  E. W. LAPP  2,981,099
HYDRA-GAUGE DYNAMOMETER
Filed April 17, 1957  2 Sheets-Sheet 1
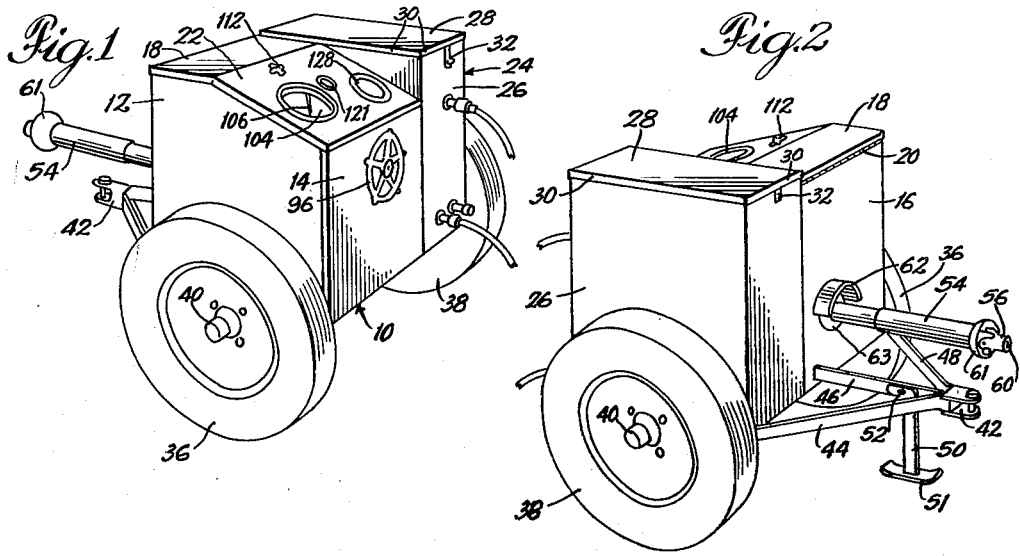
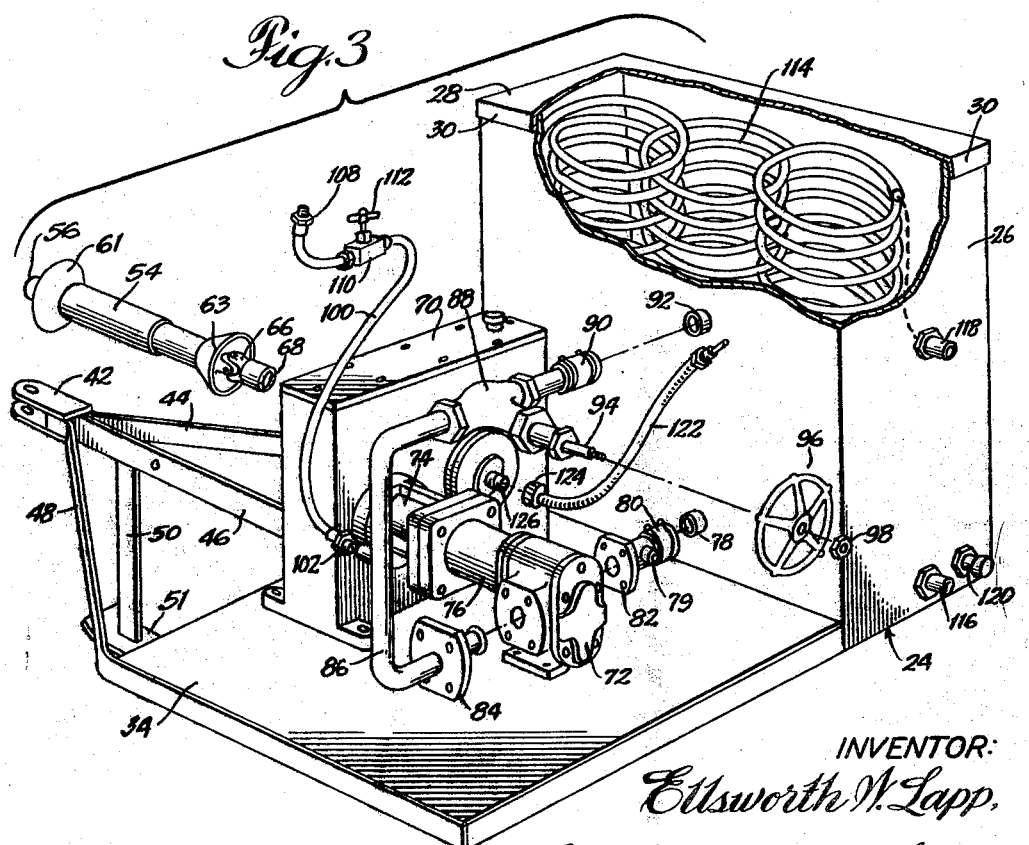
INVENTOR:
Ellsworth W. Lapp,
BY Bair, Freeman & Molinare
ATTORNEYS.

DYNAMOMETER HORSEPOWER PRESSURE GAUGE

CONVERSION CHART
BELT HORSEPOWER – P.S.I. – R.P.M.

INVENTOR:
Ellsworth W. Lapp,
BY Bair, Freeman & Molinare
ATTORNEYS.

United States Patent Office 2,981,099
Patented Apr. 25, 1961

2,981,099

HYDRA-GAUGE DYNAMOMETER

Ellsworth W. Lapp, Box 64, Anchor, Ill., assignor to Melvin E. Bonomo and Elmo R. Meiness Filed Apr. 17, 1957, Ser. No. 653,354

4 Claims. (Cl. 73—134)

This invention relates generally to measuring and testing devices and more particularly to a new and improved dynamometer adapted for measuring and testing the performance of engines, such as the type used in motor vehicles, agricultural tractors, and the like.

It is a general object of this invention to provide an improved dynamometer adapted for testing engine performance of vehicles under actual field load conditions.

It is another object of this invention to provide such a dynamometer which is a self-contained and portable assembly to the end that the dynamometer may be used at any desired location. Accordingly, it is an object of this invention to provide an improved dynamometer which may be taken to the vehicle to be tested rather than requiring the latter to be brought to the dynamometer.

It is still another object of this invention to provide an improved dynamometer which is adapted to be easily and simply coupled to the engine to be tested. More specifically, the improved dynamometer is adapted to be coupled to an existing power take off on the engine to be tested to the end that no modification or disassembly of the vehicle is required.

It is a further object of this invention to provide an improved dynamometer, as described above, in which testing under actual field load conditions is enabled through the use of a constant volume pump which may be selectively loaded to place a desired load on the engine under test.

It is a still further object of this invention to provide an improved dynamometer having a unique gauge which cooperates with the constant volume pump to provide direct indications of pump pressure and engine horsepower at a predetermined engine speed.

It is a still further object of this invention to provide a new and improved dynamometer which is characterized by its flexibility, its compactness, and its accuracy of measurement.

In accordance with a specific illustrative embodiment of this invention, these and other objects are attained in a compact, mobile dynamometer assembly which provides an indication of engine horsepower from the power developed by the engine of a motor vehicle, such as a tractor, by imposing a selectively variable load on the engine through suitable shafts and gearing connected directly to a constant volume hydraulic pump.

In accordance with important features of the invention, the constant volume pump is connected at its inlet and outlet to an oil reservoir through suitable conduits. A globe valve is provided in the outlet conduit of the pump and is operated by means of a manually operated control wheel such that the oil pressure in the conduits, arising from the operation of the pump, is increased when the valve is closed and decreased when the valve is opened.

The drive shaft of the pump is mechanically coupled through suitable shafts and gearing to a power take off drive extension which is adapted, through suitable coupling means, for ready connection to the power take off shaft of the engine to be tested. Power take off shafts suitable for this purpose commonly are provided in vehicles such as tractors and the like and it will be appreciated that the ability of the invention to test engines without requiring modification or disassembly of the vehicle is an important feature in reducing the time and the effort required by prior art devices in carrying out such tests.

It is another feature of this invention that a tachometer cable also is connected to the power take off drive extension through suitable gearing to the end that the speed of the engine under test is indicated to the operator by means of a suitable tachometer provided on the front panel of the dynamometer assembly.

In accordance with a significant feature of the invention, a pressure hose is connected between the oil conduit at the outlet of the hydraulic pump and a unique dynamometer horsepower-pressure gauge provided on the front panel. The rotation of the pump by the engine causes a pressure to be built up in the oil conduit which is a function of the engine speed and the load imposed on the engine by the globe valve. The novel dynamometer gauge serves to correlate the pump speed and the pressure developed by the pump at a given engine speed to provide a direct indication of the pressure and the engine horsepower. Advantageously, a nomograph may be provided with the dynamometer assembly to give engine horsepower readings at engine speeds other than the speed for which the gauge is set.

In accordance with a further feature of this invention, the hydraulic oil circulated through the oil reservoir, the hydraulic pump, and the pump conduits during pump operation is cooled by means of suitable cooling coils provided within the oil reservoir. Advantageously, a constant flow of a suitable coolant, such as cold water, may be made to flow constantly through the cooling coils during pump operation.

It is a still further feature of this invention that fluctuation of the indicating needle in the dynamometer horsepower-pressure gauge substantially is eliminated by means of a manually adjustable dampening valve provided in the pressure hose between the hydraulic pump and the horsepower-pressure gauge.

The above and other features of novelty which characterize the invention are pointed out which particularity in the claims annexed to and forming a part of this specification. For a better understanding of the invention, however, and its advantages reference is had to the accompanying drawing and descriptive matter in which is shown and described a specific illustrative embodiment of the invention.

In the drawing:

Figure 1 is a front perspective view of the portable dynamometer assembly embodying the invention;

Figure 2 is a rear perspective view of the portable dynamometer assembly shown in Figure 1;

Figure 3 is a partially exploded and partially broken perspective view of the interior of the dynamometer assembly;

Figure 4:
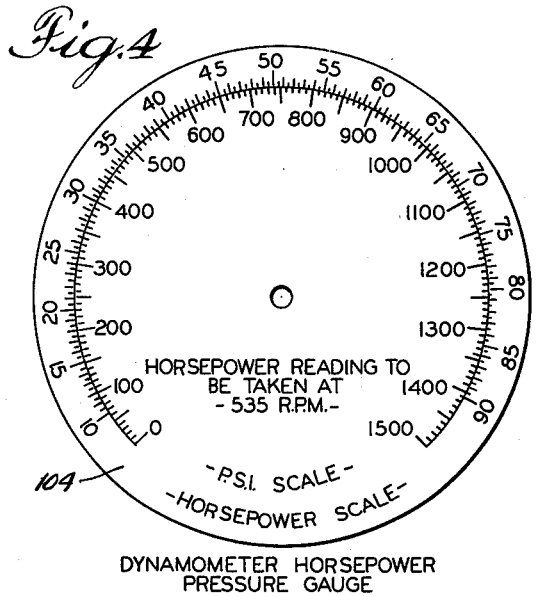
Figure 4 shows a representative horsepower-pressure gauge which advantageously may be utilized in the invention.

Referring now to the drawing, and particularly to Figures 1 and 2 thereof, there is shown a specific illustrative portable dynamometer assembly embodying features of the present invention. The dynamometer assembly advantageously comprises a main housing 10 which includes a side panel 12, a front panel 14, a back panel 16, a pivoted panel lid 18 hinged to the back panel at hinge 20 and an inclined instrument panel 22 positioned between panel lid 18 and front panel 14.

Adjacent the main housing 10 there is provided an oil reservoir 24 which includes a tank 26 and a lid 28. Advantageously, lid 28 of the oil reservoir is provided with suitable flanges 30 therearound to the end that the lid may be fitted snugly over the upper edges of the tank 26. Further, the lid and tank of the oil reservoir 24 are provided with suitable cooperating fastening means 32 to the end that the lid may be securely fastened to the tank when the former is positioned on the latter.

To facilitate portability of the dynamometer assembly, the main housing 10 is supported by a bottom frame member 34 to which is attached a pair of wheels 36 and 38 rotatably journaled in suitable bearings on axle 40. Advantageously, wheels 36 and 38 may be automotive type wheels, such as those having 14 or 15 inch rims, to provide portability within the shop.

Advantageously, the dynamometer assembly is provided with a hitch 42 carried by support members 44, 46 and 48 attached to the frame 34 and the main housing 10. It will be appreciated that when the dynamometer is used to test the engine of a tractor, for example, the hitch 42 may be attached to the tractor draw bar or any other solid object to hold the dynamometer assembly securely in position. Further, additional stability is provided for the dynamometer assembly by means of a support leg 50 and shoe 51 which are pivotally mounted on support member 46 by means of pivot 52. Thus, support leg 50 and shoe 51 may be flipped back out of the supporting position when they are not needed or flipped into position for supporting the dynamometer assembly to provide a sturdy base therefor when desired.

An elongated tubular power take off shaft extension 54 extends through a suitable opening in the back panel 16 of the dynamometer housing 10. A universal joint 56 provided at the outer end of the power take off shaft extension 54 carries an easily attachable and detachable coupler 60 to facilitate connection of shaft extension 54 to the power take off of the engine. Further, the outer end of power take off shaft extension 54 is provided with a cup-shaped shield 61 to add safety in the use of the dynamometer. Additional safety is provided by means of a second power take off extension shaft shield 63 and a guard 62 secured to the back panel 16 of housing 10 where the power take off shaft extension shaft 54 enters the housing.

The interior of the dynamometer main housing 10 and oil reservoir 24 is shown in greater detail in Figure 3 of the drawing. The inner end of the power take off shaft extension 54 is provided with a universal joint 66 and an easily attachable and detachable coupler 68. Coupler 68 is adapted to be connected through suitable shafts and gearing within the gear box assembly 70 to provide driving power for the hydraulic pump 72. Advantageously, hydraulic pump 72 is coupled to the power take off shaft extension 54 by the gearing within gear box assembly 70, a pinion shaft within the pump mounting bracket and pinion shaft bearing cage 74 and the pump drive shaft within the pump drive coupler housing 76. Thus, it will be appreciated that when the engine under test is operated, the hydraulic pump 72 is driven accordingly through the coupling and drive elements provided between the pump and the engine.

The tank 26 of oil reservoir 24 advantageously is filled with a suitable hydraulic fluid, such as oil, which is circulated by the operation of the pump through a hydraulic circuit including tank 26, the oil outlet 78 at the bottom of the tank, hose 80 and pump inlet fitting 82, the hydraulic pump 72, the pump outlet fitting 84 and oil conduit 86, globe valve 88, hose 90, and the oil inlet 92 at the upper portion of tank 26.

The globe valve 88, which is a type well known in the art, is operated by means of a valve shaft 94, which extends through the front panel 14 of the dynamometer main housing 10, and a manually operable control wheel 96 attached to valve shaft 94 by means of a suitable nut 98 or the like.

Now, it will be appreciated that in the operation of the dynamometer, rotation of the pump 72 by the engine under test causes the hydraulic oil to be circulated from the oil reservoir 24 through the hydraulic pump, the oil conduit 86 and globe valve 88 back into the oil reservoir. The oil pressure that results from the operation of the hydraulic pump 72 will be determined by the speed of rotation of the pump and the condition of globe valve 88. Thus, if the control wheel 96 is turned to close the valve, the hydraulic pressure in the oil conduit 86 will be increased and, conversely, when the control wheel 96 is rotated to open the valve, the pressure in the oil conduit 86 will be reduced.

A pressure hose 100 is connected, as by means of connector 102, to the oil conduit 86 between the pump 72 and the globe valve 88 to the end that the oil pressure in conduit 86 is communicated to a unique horsepower-pressure gauge 104 on the instrument panel 22 of the dynamometer housing 10. Pressure hose 100 is operatively connected by a suitable connector 108 to the indicating needle 106 of horsepower-pressure gauge 104 and in accordance with a feature of this invention, fluctuation of indicating needle 106 during pump operation is substantially eliminated by means of a dampening valve 110 inserted in the pressure hose 100. Dampening valve 110, which may be of any type well known in the art which absorbs and smooths out line fluctuations, advantageously is provided with a manually adjustable control knob 112 which is located on the instrument panel 22 of the dynamometer main housing 10 to facilitate operator adjustment thereof.

The hydraulic oil utilized in the hydraulic circuit is caused to be continuously re-circulated through the hydraulic circuit by the operation of the hydraulic pump 72. In accordance with an aspect of this invention, the re-circulated oil is cooled by means of a plurality of cooling coils 114 positioned within oil tank 26. Any suitable coolant may be circulated through cooling coils 114 and, advantageously, cold water may be used for this purpose. The cold water is supplied to cooling coils 114 through a water inlet pipe 116 provided at the lower portion of tank 26 and the water leaves cooling coils 114 through a water outlet pipe 118 provided at the upper portion of tank 26. It will be appreciated that in the operation of the invention, a suitable water hose may be connected to inlet pipe 116 and a discharge hose may be connected to outlet pipe 118. Additionally, a drain pipe 120 for the hydraulic oil within tank 26 is provided adjacent the water inlet pipe 116.

In accordance with a further aspect of this invention, a tachometer cable 122 of a type well known in the art is connected to the gear box assembly 70 by connectors 124 and 126 to the end that the speed of rotation of the power take off shaft extension 54 may be indicated at a suitable tachometer gauge 128 provided on the instrument panel 22 of the dynamometer main housing 10.

In the operation of the invention, the mobile dynamometer unit is wheeled up to the engine to be tested, such as the engine of a tractor, and the power take off shaft extension 54 is connected to the power take off shaft of the engine. The dynamometer hitch 42 is attached to a solid object, such as the draw bar of the tractor, to securely hold the unit in position. A water inlet hose is connected to water inlet pipe 116 and a water drain hose is connected to the water outlet pipe 118 of the oil reservoir tank 26. The globe valve control wheel 96 is turned to close globe valve 88 to provide maximum pressure on the pump 72. Knob 112 of the dampening valve 110 is opened.

The speed of the tractor engine is tested first by starting the engine and engaging its power take off shaft. This places all of the moving parts of the dynamometer in motion. The tractor engine is operated with a wide open throttle and the power take off speed is shown on the power take off shaft tachometer gauge 128. Thus, if the power take off speed is different from the manufacturer's recommended speed, this condition may be corrected by suitable adjustment of the governor or throttle linkage.

When the tractor is operating at its normal temperature and at wide open throttle, the globe valve control wheel 96 is rotated to load the dynamometer so that the tachometer gauge 128 will indicate approximately 250 r.p.m. This places the tractor engine under a severe load and any defective valves in the engine will cause it to run in an uneven manner, or it may even cause the tractor engine to stall. Defective piston rings in the piston engine will cause considerable blow-by and excessive blow-by will indicate low compression. Further, the spark plugs in the engine may be checked as defective spark plugs will misfire under this heavy load. Thus, it will be appreciated that in a very short time and in a relatively simple manner, the operator has tested the engine for compression, valves, and spark plugs. Manifestly, an engine having a defective condition as indicated by these tests should be repaired before attempting any further tests with the dynamometer.

The timing of the engine ignition then may be tested by again operating the tractor engine at normal temperature and at wide open throttle. The globe valve control wheel 96 is turned to load the dynamometer to approximately 425 r.p.m. as indicated on the tachometer gauge 128. The ignition distributor or magneto of the engine then is adjusted until the highest r.p.m. reading is obtained on the tachometer gauge 128. It will be appreciated by those skilled in the art that by setting the ignition system under such a load, the tractor's performance while working in the field is simulated. Further, setting the ignition under this load will set the engine to pull at optimum performance.

A carburetor adjustment of the engine may be made after setting the ignition timing by installing a gasoline flow meter of any suitable type to the carburetor of the engine under test. After the engine is operating at its normal temperature and at wide open throttle, the globe valve control wheel 96 is rotated to load the dynamometer to the manufacturer's recommended power take off shaft speed. This normally is 535 r.p.m. with most of the tractor's available today.

Figure 5:
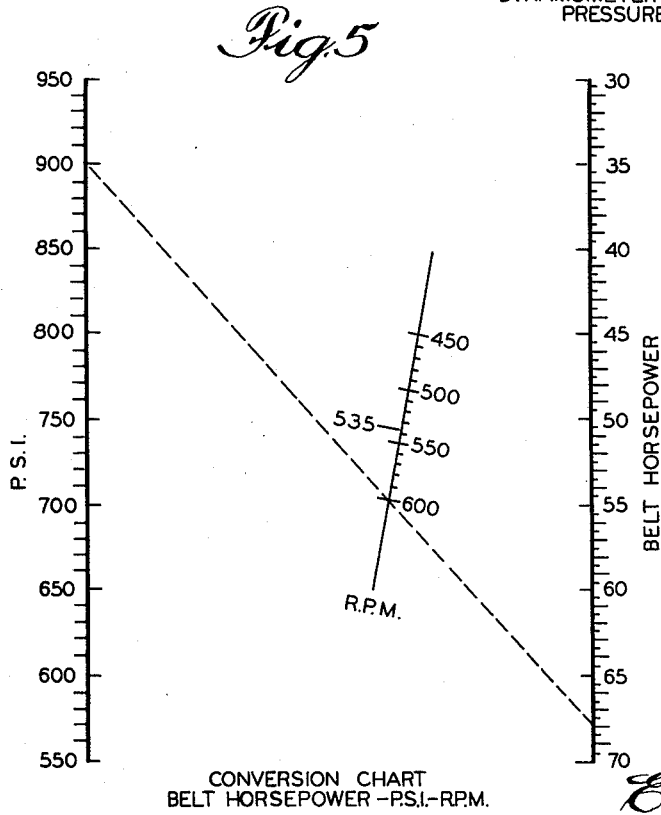
Figure 5 shows a nomograph of a conversion chart for determining engine horsepower at various combinations of pump pressure and engine speeds.

The belt horsepower of the engine then is read on the horsepower-pressure gauge 104 located on the instrument panel. A representative horsepower-pressure gauge is shown in Figure 4 of the drawing and includes a horsepower scale which varies from 0 to 100 and a pressure scale in pounds per square inch which varies from 0 to 1500. In the specific illustrative gauge shown in Figure 4, the horsepower scale and the pressure scale are correlated to provide horsepower readings when the power take off shaft speed is equal to 535 r.p.m. For power take off shaft speeds other than 535 r.p.m., a conversion chart such as that shown in Figure 5 may be used to provide belt horsepower readings.

After the belt horsepower reading is obtained, either from the horsepower-pressure gauge or the conversion chart, the flow meter reading in gallons per hour is noted and the carburetor main jet is adjusted until the flow meter registers the manufacturer's recommended gas consumption at maximum horsepower. The main carburetor jet may be adjusted to see if the gallons of gas per hour used may be reduced without reducing the maximum horsepower reading of the dynamometer. It has been found when the invention is used with new tractors that the carburetor which is set at the manufacturer's recommendation should normally show the manufacturer's maximum belt horsepower if timing, valve clearances, compression, etc. all are correct.

When the carburetor of a used tractor is adjusted by the invention, it has been found that a registeration on the flow meter of a gallons per hour rate above the manufacturer's recommendation with the main carburetor jet opened about two turns is a fair indication of proper operation of the carburetor. If, however, the gallons per hour rate is below the manufacturer's recommendation, it is an indication that the carburetor is not working properly and that it should be cleaned and repaired before proceeding with the dynamometer test.

When making carburetor adjustments it is important for the operator to remember that the tractor will probably pull its maximum belt horsepower with the carburetor set at too rich a mixture. Thus, by simply closing the main jet of the carburetor to just maintain the maximum horsepower reading, the saving of many gallons of gas per year may be realized.

Checking of the tractor for belt horsepower is possible after the ignition timing and carburetor adjustments have been made. With the tractor engine running at normal operating temperature, the control wheel 96 of globe valve 88 is rotated to load the tractor to the manufacturer's recommended power take off shaft speed. As explained heretofore, if this shaft speed is 535 r.p.m., as normally is the case, the horsepower-pressure gauge 104 shown in Figure 4 may be used, and if the power take off speed is other than 535 r.p.m., the conversion chart shown in Figure 5 may be used.

When the dynamometer is loaded to the recommended power take off shaft speed, the engine is permitted to run until the temperature indicator 121 on the instrument panel reads approximately 160 to 170°. Advantageously, the temperature measurement is taken at the coupling provided in the pump inlet fitting 82 so that the temperature of the hydraulic oil as it enters the pump 72 will be known. Manifestly, this may be done by any suitable temperature sensitive means suitable for this purpose which will provide an indication on the temperature indicator 121. Control wheel 96 then is rotated to load the dynamometer down to approximately 100 r.p.m. lower and then control wheel 96 is immediately turn in the other direction until the r.p.m. reading returns to 535 r.p.m. or what ever other recommended speed is being used. The reason for increasing the load on the dynamometer and then immediately reducing it again to the recommended speed is to assure that the carburetor on the tractor engine is wide open. At this time, the belt horsepower may be read directly on the dynamometer gauge shown in Figure 4 if the recommended speed is 535 r.p.m. due to the unique correlation of pressure and horsepower thereon. If the recommended speed is other than 535 r.p.m., the pressure in pounds per square inch is read from gauge 104 and the engine speed is read from the dynamometer 128. These two values then are plotted on the conversion chart shown in Figure 5 to provide an indication of belt horsepower.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What is claimed as the invention is:

1. A dynamometer assembly for testing and measuring characteristics of an engine comprising a housing having positioned therewithin a fixed displacement hydraulic pump including a rotor and a casing, fastening means affixing said casing in stationary position on said housing, driving means coupling the rotor of said pump to a power take-off shaft on the engine, a hydraulic fluid reservoir, conduit means connecting said hydraulic fluid reservoir with said hydraulic pump whereby said fluid is circulated in the hydraulic circuit including the reservoir and the pump when the rotor is driven by the engine, selectively controllable valve means in said conduit means at the discharge end of said pump for selectively varying the load placed on the engine, and gauge means connected to said conduit means between the pump and said valve means for providing a direct indication of the horsepower of the engine under test, said gauge means comprising a dial having indicia for enabling measurement of the hydraulic fluid pressure in said conduit means and of the engine horsepower, said pressure and horsepower indicia on said dial being correlated at a predetermined engine speed, and tachometer means coupled to said power take-off shaft for providing an indication of the speed of the engine power take-off shaft.

2. A compact dynamometer assembly for testing and measuring characteristics of an engine comprising a mobile frame having a main housing and a hydraulic fluid reservoir supportingly mounted thereon, a power take-off shaft extension adapted to be coupled to the power take-off shaft of the engine extending through said housing, said housing having positioned therewithin a fixed displacement hydraulic pump including a stationary casing fixedly mounted on said housing and rotor means within said casing coupled to said power take-off extension for rotation thereby, conduit means connecting said hydraulic pump in a hydraulic circuit with said hydraulic fluid reservoir whereby the hydraulic fluid is circulated through said circuit when the rotor means of said pump is driven by the engine, manually controllable valve means positioned in said conduit means at the discharge end of said hydraulic pump for varying the load placed on the engine by the dynamometer assembly, and gauge means for providing a direct indication of the engine horsepower in accordance with the hydraulic pressure in said conduit means, said gauge means including a pressure hose attached to said conduit means between the discharge end of said pump and said valve means, and an indicating gauge, operatively connected to said pressure hose, having an indicator whose operating position is responsive to the hydraulic pressure in said pressure hose, said indicating gauge comprising a dial having indicia for enabling measurement of the hydraulic fluid pressure in said conduit means and of the engine horsepower, said pressure and horsepower indicia in said dial being correlated at a predetermined engine speed and further comprising a tachometer coupled to said power take-off shaft extension for providing an indication of the speed of the engine power take-off shaft.

3. A dynamometer assembly in accordance with claim 2 further comprising damping means in said pressure hose for damping the hydraulic fluid pressure changes therein to reduce fluctuations of said indicator, and manually controllable valve means connected to said damping means for enabling selective adjustment thereof.

4. A dynamometer assembly in accordance with claim 2 further comprising gear means coupling said power take-off shaft extension to the hydraulic pump rotor for enabling horsepower indications to be provided by said gauge means over a wide range of engine output speeds regardless of the direction of rotation of the engine power take-off shaft.

References Cited in the file of this patent

UNITED STATES PATENTS

| 1,453,354 | Hem | May 1, 1923 |
| 1,743,409 | Tracy | Jan. 14, 1930 |
| 1,992,911 | De La Mater | Feb. 26, 1935 |
| 2,452,550 | Cline | Nov. 2, 1948 |
| 2,603,968 | Cline | July 22, 1952 |
| 2,638,781 | McDuffie et al. | May 19, 1953 |
| 2,667,238 | Bennett | Jan. 26, 1954 |
| 2,706,405 | Mann | Apr. 19, 1955 |
| 2,716,339 | Cline | Aug. 30, 1955 |
| 2,749,747 | Cline | June 12, 1956 |

FOREIGN PATENTS

| 128,613 | Great Britain | July 9, 1919 |
| 552,586 | Great Britain | Apr. 15, 1943 |